United States Patent [19]

Hetzler et al.

[11] Patent Number: 5,023,142

[45] Date of Patent: Jun. 11, 1991

[54] NON-TELESCOPING POLYETHYLENE FILM ROLL AND METHOD FOR PRODUCING SAME

[75] Inventors: Kevin G. Hetzler, Neenah; Wayne M. Wegner; Billie C. Munger, both of Appleton, all of Wis.

[73] Assignee: Reynolds Consumer Products, Inc., Appleton, Wis.

[21] Appl. No.: 407,415

[22] Filed: Sep. 14, 1989

Related U.S. Application Data

[63] Continuation of Ser. No. 228,286, Aug. 4, 1988, abandoned.

[51] Int. Cl.⁵ .................. C08L 23/06; C08L 23/12; B32B 27/32
[52] U.S. Cl. ................................ 428/500; 428/906; 525/240
[58] Field of Search ............... 525/240; 428/500, 906

[56] References Cited

U.S. PATENT DOCUMENTS

| | | | |
|---|---|---|---|
| 4,123,417 | 10/1978 | Finberg | 525/240 |
| 4,126,648 | 11/1978 | Agouri et al. | 525/240 |
| 4,222,913 | 9/1980 | Cooper | 525/240 |
| 4,352,911 | 10/1982 | Spence | 525/211 |
| 4,510,031 | 4/1985 | Matsumura et al. | 204/159.20 |
| 4,565,847 | 1/1986 | Bahl et al. | 525/240 |
| 4,588,650 | 5/1986 | Mientus et al. | 428/516 |
| 4,632,861 | 12/1986 | Vassilatos | 525/240 |
| 4,634,739 | 1/1987 | Vassilatos | 525/240 |
| 4,657,982 | 4/1987 | Breck et al. | 525/240 |
| 4,692,496 | 9/1987 | Bahl et al. | 525/240 |

FOREIGN PATENT DOCUMENTS

159281 2/1970 New Zealand .

OTHER PUBLICATIONS

Ward, "Life After the Frost Line", incorporated into Tappi Notes 1988 Film Extrusion Short Course/Seminar, p. 35.

Hadlock, "The Principles of Winding", Pima, Feb. 1979, pp. 13-16.

Primary Examiner—James Seidleck
Attorney, Agent, or Firm—Willian Brinks Olds Hofer Gilson & Lione

[57] ABSTRACT

A small amount of polypropylene material is added to polyethylene in order to produce a composition which substantially eliminates telescoping during storage of rolls of film. The anti-telescoping composition can contain other additives such as liquid additives and/or tackifiers (whether or not liquid). When such additives are used, the anti-telescoping composition of the invention allows the use of greater quantities of these additives in polyethylene than would otherwise be possible without causing telescoping.

13 Claims, 1 Drawing Sheet

NON-TELESCOPING POLYETHYLENE FILM ROLL AND METHOD FOR PRODUCING SAME

This is a continuation of application Ser. No. 07/228,286, filed Aug. 4, 1988, now abandoned.

FIELD OF THE INVENTION

This invention relates to a composition and method for eliminating telescoping in rolls of film, including both single layer polyethylene film structures and multi-layer films having polyethylene as an outer layer.

BACKGROUND OF THE INVENTION

Telescoping is a process by which a roll of plastic film, initially cylindrical in shape, encounters an imbalance of forces causing the core and inner film layers to slide to one side or the other relative to the outer layers. This is also known as "coning," since the film roll takes on a shape resembling a telescope or cone, with the core and innermost film layers representing the apex of the cone (see FIGS. 1 and 2).

A number of factors are believed to cause telescoping. For example, films containing liquid additives and/or tackifiers (whether or not liquid) will often telescope when exposed to high (e.g. summertime) storage temperatures for extended periods of time. The liquid additives and/or tackifiers behave essentially as lubricants at elevated temperatures, causing a reduction in friction between the film layers. Furthermore, temperature-induced expansion of the film material can cause "squeezing" of the core and of the inner film layers.

Other factors which contribute to telescoping include nonuniform tension or misalignment of the film roll caused by imperfect winding, excessive levels of liquid additives at any temperatures, excessive levels of low molecular weight materials, and rough handling of the film roll.

Until now, efforts to reduce film telescoping have primarily involved restricting or reducing the levels of liquid additives, experimenting with winder speed and other process conditions, and varying the type of resin used to produce the film.

SUMMARY OF THE INVENTION

It has been discovered that telescoping of film rolls comprising a layer polyethylene film can be substantially eliminated by blending small amounts of a polypropylene material with the polyethylene prior to or during extrusion of the film. The resulting composition has been found to substantially eliminate telescoping both in single layer polyethylene films and in multilayer films having polyethylene as an outer layer.

It has furthermore been discovered that the addition of small amounts of polypropylene to polyethylene causes a tremendous increase in the level of liquid additives and/or tackifiers (whether or not liquid) which can be added to the polyethylene before telescoping will occur.

The invention will be further understood upon consideration of the following detailed description.

DETAILED DESCRIPTION OF THE PREFERRED EMBODIMENTS

Figure 1:
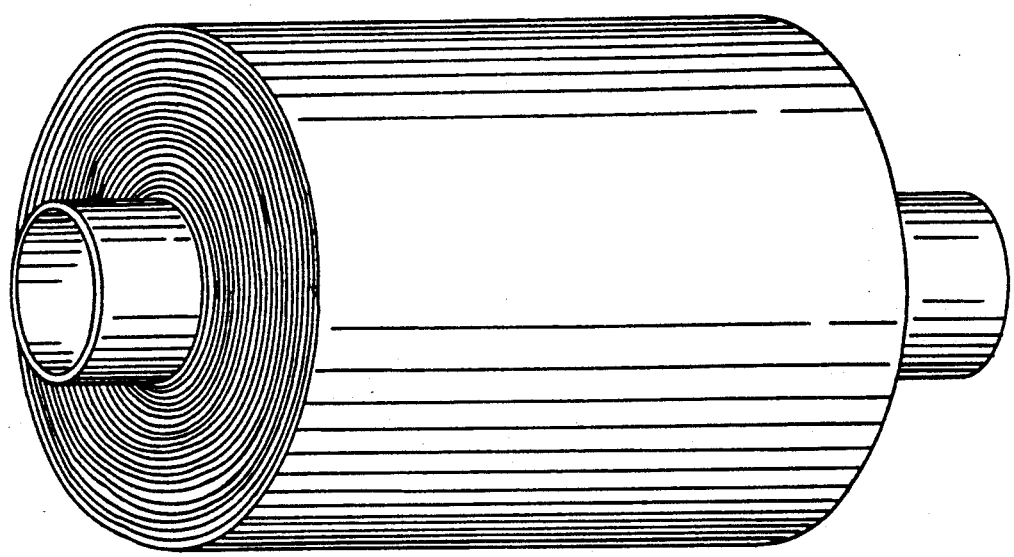
FIG. 1 shows a normal, cylindrically shaped roll of polyethylene film.
Figure 2:
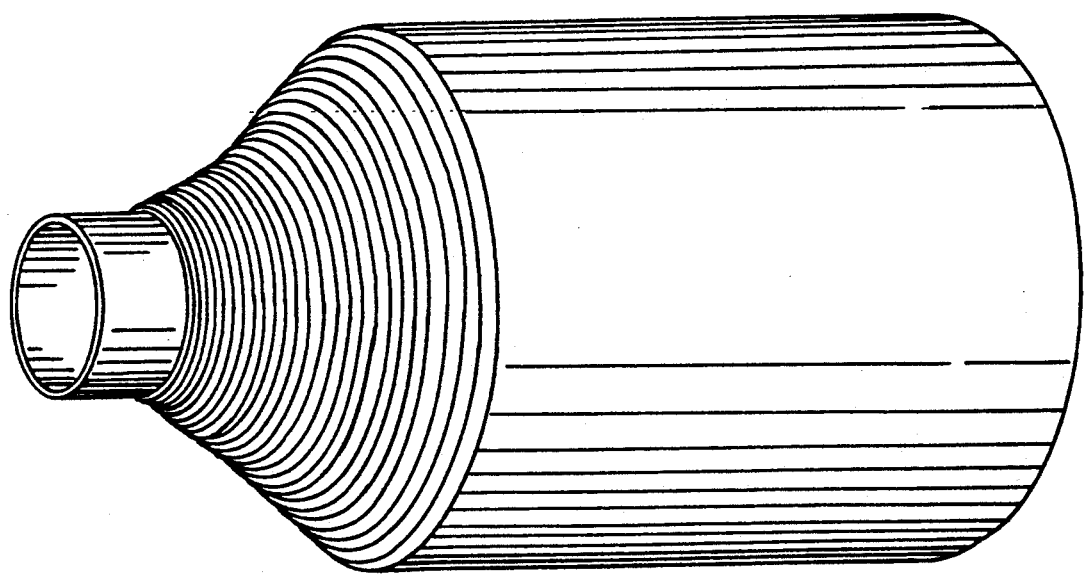
FIG. 2 shows a polyethylene film roll which has telescoped.

The anti-telescoping composition of the invention comprises generally a blend of between about 0.25% and about 6.0% polypropylene with polyethylene. Preferably, the composition will contain between about 1.0% and about 3.0% polypropylene by weight. It is presently considered most preferable for the anti-telescoping composition to contain about 2.0% polypropylene.

The term "polypropylene" is intended to encompass all plastic resin materials which are commonly known in the art as polypropylene homopolymers, propylene-ethylene block copolymers, propylene-ethylene random copolymers, and blends thereof having densities of between about 0.89 grams/cm$^3$ and about 0.91 grams/cm$^3$. Preferably, the ethylene content of the polypropylene material should be less than about 6.0%. Also included are polypropylene materials which have been grafted with up to about 6.0% of a comonomer such as acrylic acid. The polypropylene material should have a melt flow rate of greater than about 0.9 grams/10 minutes at 230° C., as measured by ASTM procedure D-1238. The melt flow rate of the polypropylene will preferably exceed 20 grams/10 minutes and, in the most preferred embodiment, will exceed 30 grams/10 minutes.

The term "polyethylene" is intended to encompass all plastic resins which are commonly known as high density polyethylene, low density polyethylene, linear low density polyethylene, and blends thereof.

In order to produce the anti-telescoping composition of the invention, the polypropylene may be added to the polyethylene either before or during the film extrusion process. Before extrusion, the polypropylene and polyethylene may be melt-blended using, for example, a Banbury mixer or a twin-screw extruder. The components may, alternatively, be "dry" blended by mixing pellets and/or powder together, as at ambient temperature.

Alternatively, the polypropylene and polyethylene may be combined during film extrusion by utilizing two separate feeders (one for polypropylene and one for polyethylene) which feed to the same film extruder. This latter method is preferred because the polypropylene and polyethylene blend together inside the film extruder, eliminating the need for a separate blending step.

The anti-telescoping composition of the invention may also contain additives other than polypropylene, including liquid additives and/or tackifiers (whether or not liquid), in compositions of up to about 10% by weight, preferably 0.1 to 10% by weight. Included among these are additives which, but for the polypropylene, would cause the resulting film roll to telescope. Such additives may be present in greater quantities than would be possible if no polypropylene were included.

Polybutene is one example of a tackifier which may be included in the anti-telescoping composition of the invention in greater quantities than would otherwise be possible without the inclusion of polypropylene. When 2-6% polypropylene is added to linear low density polyethylene, for instance, up to about 10.0% polybutene may be added without causing the film roll to telescope. Without polypropylene, only about 2-5% polybutene could be added to the linear low density polyethylene before telescoping occurs. These amounts may vary somewhat with different grades at linear low density polyethylene, different types of polyethylene, and different extrusion processes and conditions.

The non-telescoping films of the invention may be produced using any suitable extrusion process including blown film extrusion, cast film extrusion, sheet extrusion, extrusion coating, thermal laminating and the like. The anti-telescoping composition of the invention may form the only layer of a single-layer film or may, alternatively, form one layer of a multilayer coextruded film. When a multilayer film is produced by combining the anti-telescoping composition of the invention with one or more additional layers, the anti-telescoping composition will preferably be present as an outer layer. In a highly preferred multilayer film, both outer layers will comprise the anti-telescoping composition of the invention, with any additional layers sandwiched in between the two anti-telescoping layers.

The following examples serve to further highlight the present invention.

EXAMPLE 1

Union Carbide 7093, a linear low density polyethylene resin having a density of 0.925 grams/cc and a melt index at 190° C. of 1.9 grams/10 minutes per ASTM D-1238 was blended with 2.5% by weight of Amoco H-300, a polybutene tackifier having a density of 0.88 grams/cc and a number average molecular weight of 1290. The blend was cast into a single layer film using an extrusion melt temperature of 550° F. Two film samples 18 inches wide, 1500 feet long, and 0.80 gauge thick were wrapped around cores to form film rolls. The film rolls were stored at a temperature of 65° C. for a period of 24 hours. Both rolls of film telescoped about one inch.

EXAMPLE 2

Two percent of Exxon 3035, a polypropylene homopolymer having a density of 0.900 g/cc and a melt flow rate at 230° C. of between 30 and 35 grams/10 minutes per ASTM D-1238, was added to the composition of EXAMPLE 1 during the film extrusion process. The blend was cast into a single layer using an extrusion melt temperature of 550° F. Two film samples 18 inches wide, 1500 feet long, and 0.80 gauge thick were wrapped around cores to form film rolls. The films were stored at a temperature of 65° C. for a period of 24 hours. Neither roll of film telescoped.

EXAMPLE 3

Exxon 3202.55, a linear low density polyethylene having a density of 0.924 grams/cc and a melt index at 190° C. of 1.9 grams/10 minutes per ASTM D-1238, was blended with 1.5% Amoco H-300 polybutene during the film extrusion process. The blend was cast into a single layer film using an extrusion melt temperature of 550° F. Two film samples 18 inches wide, 1500 feet long, and 0.80 gauge thick were wrapped around cores to form film rolls. The film rolls were stored at a temperature of 65° C. for a period of 24 hours. Both rolls of film telescoped about two inches.

EXAMPLE 4

Two percent of Exxon 3035 polypropylene was added to the composition of EXAMPLE 3 during the extrusion process. The blend was cast into a single layer using an extrusion melt temperature of 550° F. Two film samples 18 inches wide, 1500 feet long, and 0.80 gauge thick were wrapped around cores to form film rolls. The film rolls were stored at a temperature of 65° C. for a period of 24 hours. Neither roll of film telescoped.

EXAMPLE 5

The amount of Amoco H-300 in the composition of EXAMPLE 4 was increased from 1.5% to 2.5%. Two film samples 18 inches wide, 1500 feet long, and 0.80 gauge thick were produced using conditions identical to those described in EXAMPLE 4 and were wrapped around cores to form film rolls. The film rolls were stored at a temperature of 65° C. for a period of 24 hours. Neither film roll telescoped.

EXAMPLE 6

Union Carbide 7047, a linear low density polyethylene resin having a density of 0.918 grams/cc and a melt index at 190° C. of 1.0 gram/10 minutes per ASTM D-1238, was blended with 4.4% Amoco H-300 polybutene during the film extrusion process. A sample of blown film was produced using an extrusion melt temperature at 460° F. The film sample, which was 18 inches wide, 1500 feet long, and 0.80 gauge thick, was wrapped around a core to form a film roll. The film roll was stored at a temperature of 65° C. for a period of 18 hours. The roll of film telescoped about 1.5 inches.

EXAMPLE 7

One percent of Exxon 3035 polypropylene was added to the composition of EXAMPLE 6 during the extrusion process. A sample of blown film was produced using an extrusion melt temperature of 460° F. The film sample, which was 18 inches wide, 1500 feet long, and 0.80 gauge thick, was wrapped around a core to form a film roll. The film roll was stored at 65° C. for 18 hours. The film roll did not telescope.

EXAMPLE 8

The amount of Amoco H-300 polybutene in the composition of EXAMPLE 7 was increased to 5.0%. A sample of blown film was produced using an extrusion melt temperature of 460° F. The film sample, which was 18 inches wide, 1500 feet long, and 0.80 gauge thick, was wrapped around a core to form a film roll. The film roll was stored at 65° C. for 18 hours. The film roll did not telescope.

While the preferred embodiments of the invention have been disclosed, it is understood that the invention is not limited to the disclosed examples. Modifications in addition to those discussed can be made without departing from the invention. The scope of the invention is indicated in the appended claims, and all changes that come within the meaning and range of equivalency of the claims are intended to be embraced therein.

I claim:

1. A film composition comprising an anti-telescoping film layer which consists of:
    linear low density polyethylene;
    between about 0.25% and about 6.0% polypropylene; and 0.1–10% tackifier;
    based on the weight of the anti-telescoping film layer.

2. The film composition of claim 1 wherein the polypropylene has a melt flow rate of greater than about 0.9 grams/10 min.

3. The film composition of claim 2 wherein the polypropylene has a melt flow rate of greater than about 20 grams/10 min.

4. The film composition of claim 3 wherein the polypropylene has a melt flow rate of greater than about 30 grams/10 min.

5. The film composition of claim 1 wherein the polypropylene composition is between about 1.0% and about 3.0% based on the weight of the anti-telescoping layer.

6. The film composition of claim 1 wherein the polypropylene composition is about 2.0% based on the weight of the anti-telescoping layer.

7. The film composition of claim 1 wherein the tackifier comprises polybutene.

8. The film composition of claim 1 wherein the anti-telescoping film layer is the only layer of the film composition.

9. The film composition of claim 1 comprising one or more film layers in addition to the anti-telescoping film layer, wherein the anti-telescoping film layer forms an outer layer of the film composition.

10. The film composition of claim 1 comprising two anti-telescoping film layers and one or more additional film layers, wherein both anti-telescoping film layers form outer layers of the film composition.

11. A film composition comprising an anti-telescoping film layer which consists essentially of:
   linear low density polyethylene;
   between about 0.25% and about 6.0% polypropylene; and
   0.1-10% polybutene.

12. The film composition of claim 11 wherein the polypropylene is present in an amount of between 1.0% and 3.0% based on the weight of the anti-telescoping film layer.

13. The film composition of claim 11 wherein the polypropylene is present in an amount of about 2.0% based on the weight of the anti-telescoping film layer.

* * * * *